US007116427B2

(12) United States Patent
Baney et al.

(10) Patent No.: US 7,116,427 B2
(45) Date of Patent: Oct. 3, 2006

(54) LOW POWER CONSUMPTION, BROAD NAVIGABILITY OPTICAL MOUSE

(75) Inventors: Douglas M. Baney, Los Altos, CA (US); Tong Xie, San Jose, CA (US); Marshall T. DePue, San Mateo, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 358 days.

(21) Appl. No.: 10/697,421

(22) Filed: Oct. 30, 2003

(65) Prior Publication Data

US 2005/0094154 A1    May 5, 2005

(51) Int. Cl.
*G01B 9/02*  (2006.01)
*G09G 5/08*  (2006.01)

(52) U.S. Cl. .................... 356/498; 345/166
(58) Field of Classification Search ............. 356/486, 356/493, 498, 499, 521; 345/157, 166
See application file for complete search history.

(56) References Cited

U.S. PATENT DOCUMENTS

| 5,578,813 | A | 11/1996 | Allen et al. |
| 5,644,139 | A | 7/1997 | Allen et al. |
| 5,786,804 | A | 7/1998 | Gordon |
| 6,281,882 | B1 | 8/2001 | Gordon et al. |
| 6,433,780 | B1 | 8/2002 | Gordon et al. |
| 6,442,725 | B1 | 8/2002 | Schipke et al. |
| 2005/0231482 | A1* | 10/2005 | Theytaz et al. ............. 345/166 |

OTHER PUBLICATIONS

Xie, Tong, "Interferometer Based Navigation Device," U.S. Appl. No. 10/439,674, filed May 16, 2003.
"Method and Device for Optical Navigation," U.S. Appl. No. 10/630,169, filed Jul. 30, 2003.
"Method and Device for Optical Navigation," U.S. Appl. No. 10/680,525, filed Oct. 6, 2003.
Siegman, A.E., "Lasers," University Science Books, 1986, pp. 54-55.
Wyant, J.C., "White Light Extended Source Shearing Interferometer," Applied Optics, vol. 13, No. 1, Jan. 1974, pp. 200-202.
Malacara, D., "Optical Shop Testing," Wiley-Interscience, ISBN 0471522325, 2nd Ed., Jan. 1992, Chapters 1-7.
Barkas, W.W., "Analysis of Light Scattered from a Surface of Low Gloss into Its Specular and Diffuse Components," Proc. PHys. Soc., vol. 51, (1939), pp. 274-295.

* cited by examiner

*Primary Examiner*—Gregory J. Toatley, Jr.
*Assistant Examiner*—Patrick Connolly

(57) ABSTRACT

An optical navigation system for determining movement relative to a navigation terrain includes a first source and a second source of optical radiation for illuminating the navigation terrain, the first source differing from the second source in at least one operating parameter. The system further includes means to select the first source and the second source independently based on decision criteria. The system further includes a detector for capturing patterns in the optical radiation subsequent to illuminating of the navigation terrain.

22 Claims, 4 Drawing Sheets

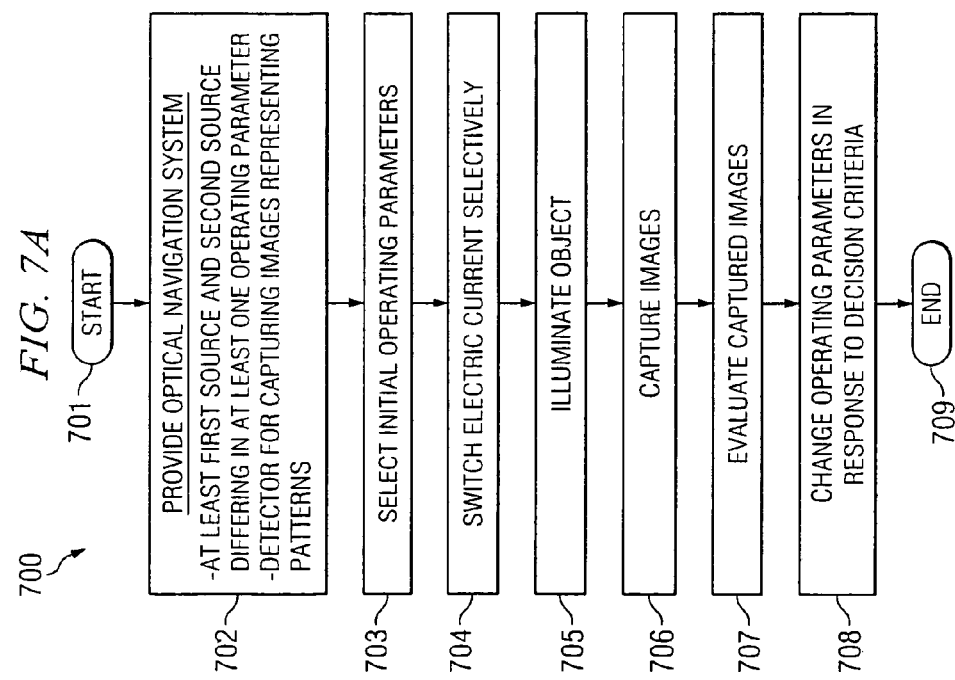
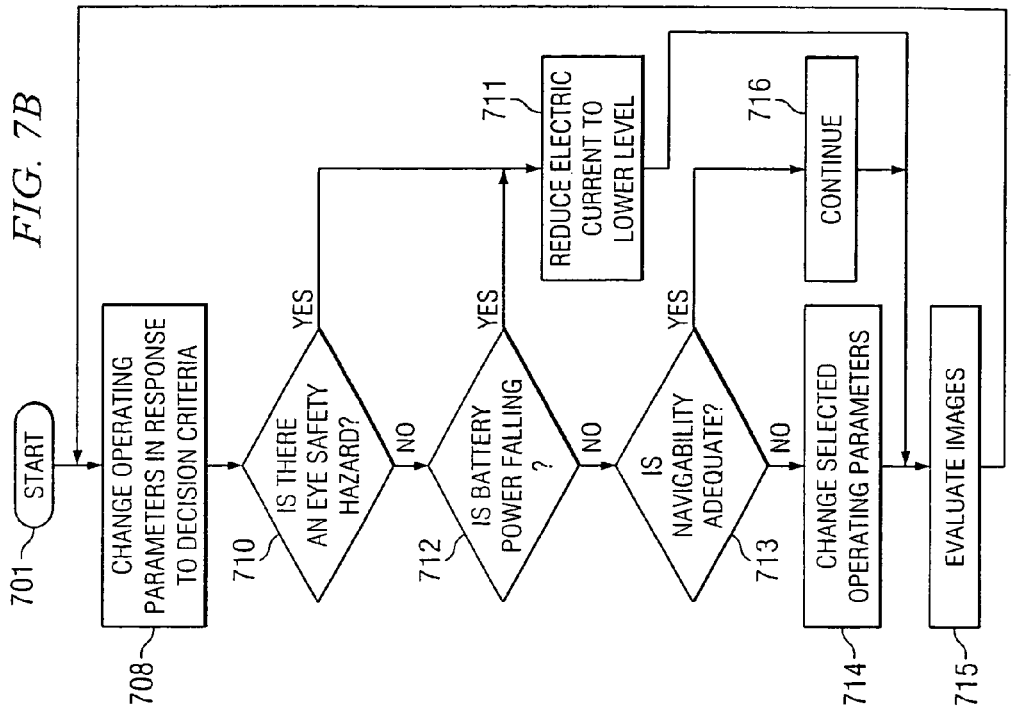

LOW POWER CONSUMPTION, BROAD NAVIGABILITY OPTICAL MOUSE

CROSS-REFERENCE TO RELATED APPLICATIONS

This application is related to co-pending and commonly assigned U.S. patent application Ser. No. 10/439,674, filed May 16, 2003, titled "INTERFEROMETER BASED NAVIGATION DEVICE," U.S. patent application Ser. No. 10/630,169, filed Jul. 30, 2003, titled "METHOD AND DEVICE FOR OPTICAL NAVIGATION," and U.S. Continuation-in-Part patent application Ser. No. 10/680,525, filed Oct. 6, 2003; titled "METHOD AND DEVICE FOR OPTICAL NAVIGATION," the disclosures of which are hereby incorporated herein by reference.

TECHNICAL FIELD

This disclosure relates to motion sensing optical devices and more particularly to systems and methods for a low power consumption, broad navigability optical mouse.

BACKGROUND OF THE INVENTION

Existing optical devices for relative motion detection utilize pattern correlation techniques to determine relative motion between the device and a surface by capturing patterns characterizing the surface as the device passes over the surface (or equivalently as the surface moves past the device). Both the distance and the direction of the device movements are determined by comparing one pattern frame with the next. This technique typically detects intensity variations of shadows on surfaces; and its sensitivity and usability depends on the intensity contrast in the captured surface patterns. Relative motion sensors are used, for example, for computer pointer (e.g., mouse) control. Such pointers typically use optics to control the position of the pointer on the computer screen. More generally, optical navigation information can be used to compensate for distortion artifacts of curvilinear and rotational movement of the scanning device along a scan path.

U.S. Pat. Nos. 5,786,804, 5,578,813, 5,644,139, 6,442,725, 6,281,882 and 6,433,780 disclose examples of optical mice, other hand-held navigation devices, and hand-held scanners. These patents are incorporated herein by reference.

Typical existing optical navigation devices use light emitting diodes (LEDs) to obliquely illuminate the surface to be navigated (the "navigation terrain") for the purpose of imaging the surface using a detector. Height variations on the surface, on the order of 5 to 500 micrometers (μm), cast shadows described by geometrical ray optics. The size and contrast of the shadow patterns depends in part on the type of surface through the size of the height variation. Typically, the detector is positioned to receive the reflection in the surface normal direction, and the angle between the surface and the incident light is typically selected to optimize the contrast of the shadow patterns, as is familiar from dark field imaging. Typical values for the angle of incidence are in the range from about 5 degrees to about 20 degrees.

Smooth surfaces such as whiteboard, high gloss paper, plastic, wood grain, or painted metal present functional challenges to typical current optical navigation devices. In general, smooth surfaces are those containing less mid spatial frequency and more high spatial frequency structures. To increase the signal level, high optical power is required for LED illumination resulting in typical current draws in excess of 30 mA.

BRIEF SUMMARY OF THE INVENTION

In accordance with the invention, an optical navigation system is provided for determining movement relative to a navigation terrain. The system includes a first source and a second source of optical radiation for illuminating the navigation terrain, the first source differing from the second source in at least one operating parameter. The system further includes means to select the first source and the second source independently based on decision criteria. The system further includes a detector for capturing patterns in the optical radiation subsequent to illuminating of the navigation terrain.

In accordance with the invention, a method for determining relative movement between an optical navigation device and a navigation terrain is provided. The method includes providing an optical navigation system. The optical navigation system includes a first source and a second source of optical radiation for illuminating a portion of the navigation terrain, the first source differing from the second source in at least one operating parameter. The optical navigation system further includes a detector for capturing patterns in the optical radiation subsequent to illuminating. The method further includes initially selecting the at least one differing operating parameter for the first and the second sources independently. The method further includes illuminating the navigation terrain portion, capturing the patterns in the optical radiation subsequent to illuminating, evaluating the captured patterns, and changing the selected at least one differing operating parameter in response to decision criteria.

BRIEF DESCRIPTION OF THE DRAWINGS

For a more complete understanding of the present invention, reference is now made to the following descriptions taken in conjunction with the accompanying drawing, in which:

FIGS. 7A–7B are flow diagrams depicting methods of operating an optical navigation system having plural sources of optical radiation, in accordance with the invention.

DETAILED DESCRIPTION OF THE INVENTION

"Inherent structure-related properties" are defined herein as properties of the navigation terrain that are attributable to factors that are independent of forming image related data and/or of systematic registration data on the navigation terrain. Optical navigation information may be formed by generating a position signal that is responsive to detection of inherent structure-related properties, for example a position signal of speckle information or a position signal that permits tracking of individual inherent structural features. "Inherent structural features" are defined herein as those features of a navigation terrain that are characteristic of processes of forming the navigation terrain and are independent of forming image related data and/or systematic registration data on the navigation terrain. For example, if the navigation terrain media is paper-based, inherent structural features of interest may be paper fibers. As another example, optical navigation of the scanning device across a glossy navigation terrain or an overhead transparency film may be determined by tracking surface texture variations that affect specular fields. Typically, inherent structural features of surface texture are microscopic, e.g. between 10 and 40 micrometers (µm) in scale.

Thus, the contemplated approaches to acquiring navigation information vary in scope. The navigation signal may, for example, be in the form of a position signal that is responsive to detection of image related data on the navigation terrain (e.g., identification of edges of text characters). In other approaches, a position signal is responsive to detection of inherent-structure related properties, for example properties that determine speckle patterns. Some implementations of the latter approaches track navigation of the scanning device by monitoring the positions of individual inherent structural features (e.g. paper fibers) over time.

Alternatively to imaging navigation systems, encoders may be used to obtain two-dimensional displacement information from track ball(s). In another approach, optical or electronic (capacitive, resistive, or inductive) sensors may be used in place of imaging navigation systems to sense position and orientation relative to a cooperative (active or passive) grid or other reference constructed in an underlying tablet that, in turn, serves as a support for the navigation terrain. Another image-free approach to acquiring position and orientation information is to provide an accelerometer. An on-board inertial navigation platform may be used. Yet another alternative approach may use any of a variety of mechanical linkages, for example similar to a pantograph, with which to track position and orientation relative to reference coordinates fixed relative to the medium being scanned.

Figure 1:
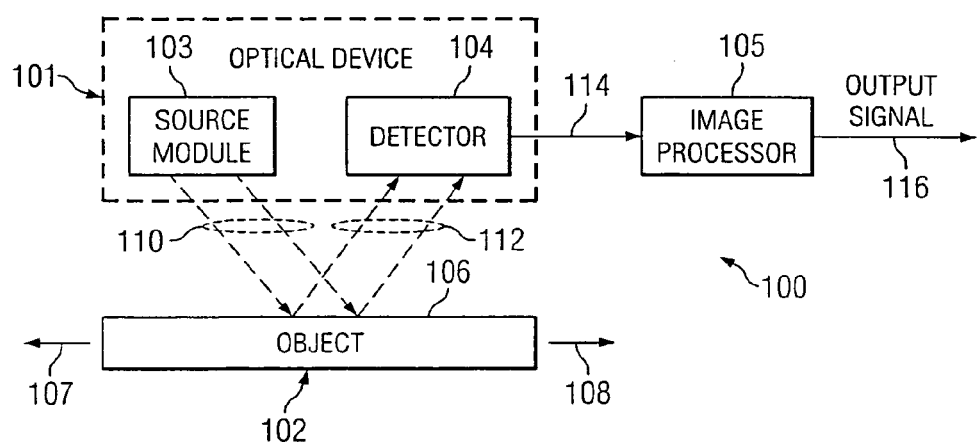
FIG. 1 is a high level block diagram representing a system for optical navigation, in accordance with the invention.

FIG. 1 is a high level block diagram representing system 100 for optical navigation. Optical navigation system 100 determines relative position between optical device 101, for example an optical mouse, and navigation terrain 102, which may be in motion (as represented by arrows 107, 108) in any direction relative to optical device 101.

In operation, navigation terrain 102 is illuminated with beam of optical radiation 110 from source module 103 of optical device 101. Beam of optical radiation 110 is processed by interaction with navigation terrain 102, such that patterns in illuminating beam of optical radiation 110 are modified in exit beam of optical radiation 112 propagating from (e.g., transmitted through or reflected from) navigation terrain 102. In some embodiments in accordance with the invention, the pattern in exit beam of optical radiation 112 is modified through interaction of beam of optical radiation 110, for example, by reflection or scattering, with surface 106 of navigation terrain 102. Alternatively, for example, the pattern may be modified through interactions occurring during transmission of beam of optical radiation 110 through the volume of navigation terrain 102.

A detector, for example detector array 104, captures a patterned exit beam of optical radiation 112 and generates signal 114. Patterns in exit beam 112 resulting from interaction of illumination beam 110 with navigation terrain 102 may include, for example, shadow, speckle, scatter, phase, and specular reflection patterns. Capture may be performed using a detector array, for example, a CCD, CMOS, GaAs, amorphous silicon, or any other suitable detector array. Typically, the wavelength spectrum in beam of optical radiation 110 emitted from source module 103 is matched to the wavelength response of detector array 104 to optimize contrast in the captured image. Signal 114 is then transmitted to processor 105, where signal 114 is further processed, and output signal 116 is generated in response to signal 114. For example, in processor 105, processing to determine relative movement can be performed traditionally using correlation algorithms that compare successive pairs of captured frames. In some embodiments in accordance with the invention, timing signals may be provided to determine relative velocity. Output signal 116 may be configured, for example, to drive the position of a pointer on a computer screen.

Source module 103 and detector array 104 are typically packaged together in optical device 101 for optical integrity. Optionally, processor 105 may also be packaged in optical device 101, but alternatively may be located elsewhere in optical navigation system 100. In some embodiments in accordance with the invention, optical device 101 represents an optical mouse for a computer system, and is optionally hand-movable by an operator.

In an embodiment in accordance with the invention, the source module in each optical navigation device typically includes one or more illumination sources configured to provide contrast dependent upon inherent structure-related properties of navigation terrain 102. For example, "grazing" light that has large angles of incidence relative to the surface normal will interact with paper fibers at or near the surface of a navigation terrain that is a paper-based, creating contrast-enhancing shadows among the fibers. On the other hand, if the navigation terrain has a glossy surface, such as a photographic print, a clay-coated paper, or an overhead transparency film, normally incident light will produce an image in the specular field that has contrast features sufficient for purposes of navigation. Optional optical elements in optical device 101, such as filters and one or more imaging elements, further improve detection of inherent structure-related properties.

Regarding illumination for enhancing the operation of the imaging detector 104, a linear array of high intensity light emitting diodes in the amber wavelength range may be used. Emitted light may be in the visible range, but this is not essential. The selection of the illumination source and any optical elements is dependent upon the medium of navigation terrain 102. The illumination wavelength is selected to maximize the contrast data acquired during the scan of a given area of navigation terrain 102, while rejecting unwanted signals and noise. Illumination optics may include LED dome lenses or may include a light guide typically including a precision-molded optical element that channels the illumination onto navigation terrain 102 with minimal light loss. Such configurations can provide relatively uniform illumination of a target area of navigation terrain 102 over a wide range of angles, yet can block normally incident rays in order to avoid specular surface reflections. Techniques for optical navigation are described in further detail in U.S. Pat. No. 5,578,813, issued Nov. 26, 1996, and in U.S. Pat. No. 5,644,139, issued Jul. 1, 1997, the disclosures of which have been incorporated herein by reference.

The system and method disclosed herein provide two or more varieties of optical radiation sources connected in a selectively electrically switched arrangement to provide different types of illumination to navigation terrain and to the processing optics. Varieties of optical radiation sources differ from one another in at least one operating parameter, for example spatial position, beam divergence/convergence, angle of incidence, radiant flux, wavelength, spectral linewidth, polarization, coherence, current consumption, temporal modulation, and various combinations of operating parameters.

Figure 2:
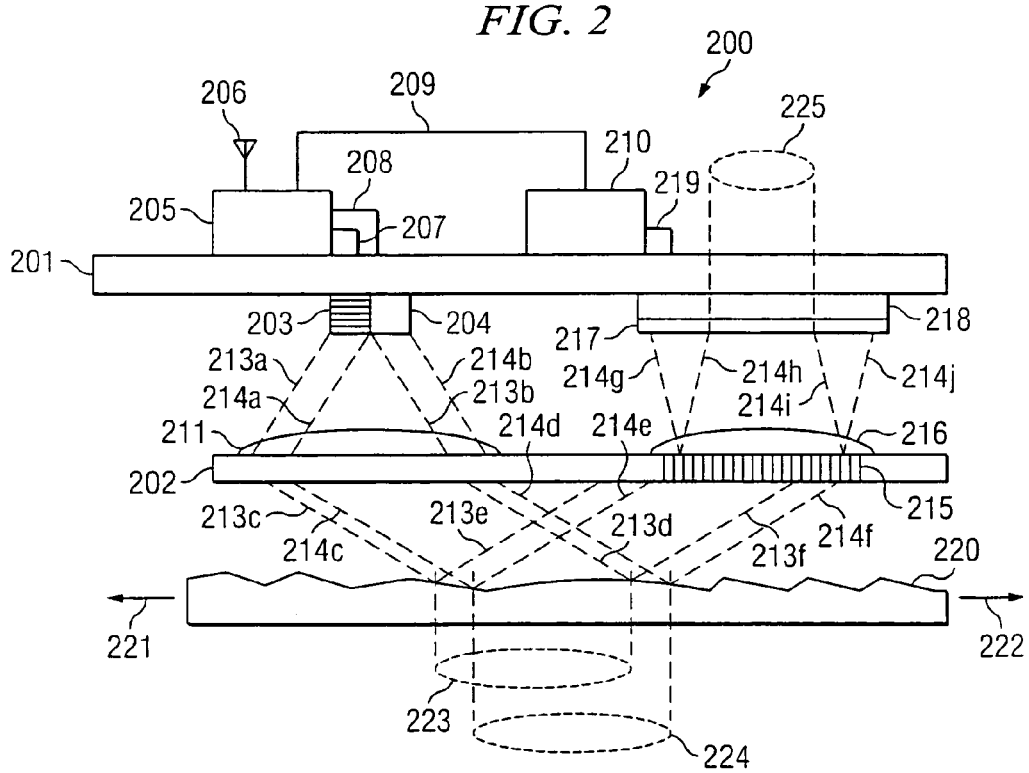
FIG. 2 is a representation of a selectable coherence optical mouse, in accordance with the invention, including plural optical radiation sources represented by dual optical radiation sources.

FIG. 2 is a schematic diagram illustrating selectable coherence optical mouse 200, in accordance with embodiments of the invention, in which source module 103 as represented in FIG. 1 includes plural optical radiation sources represented by dual optical radiation sources 203, 204. Selecting means, for example electrical switch 205, acts on instructions from a control unit, for example through remote control signal input 206, to select available optical radiation source or sources 203, 204 through electrical connections 207, 208. Optical source selection is based on decision criteria related, for example, to the navigability of navigation terrain surface 220 and the power consumption requirements of optical mouse 200. Selections of optical radiation sources include any single source or simultaneous combination of plural sources. Electric power is supplied to electrical switch 205 through source power connection 209 by electric power source 210, for example a battery. Electrical and optical elements are typically mounted in optical mouse 200, for example using structural support members 201 and 202.

Dual optical radiation sources 203, 204 provide respective optical radiation rays 213a–213b and 214a–214b incident on collimating element 211 to produce collimated rays 213c–213d and 214c–214d. Rays 213c–213d and 214c–214d need not be collimated, and consequently collimating element 211 is an optional element of optical mouse 200. If used, collimating element 211 can be any appropriate optical element, for example, a diffractive or refractive lens, to collimate optical radiation rays 213a–213b and 214a–214b. In some embodiments in accordance with the invention, source 203 or 204 emits optical radiation in the visible wavelength range, but the system may be configured to work with optical radiation in other wavelength ranges, for example, in the infrared (IR) region, where silicon detector responsivity peaks.

Collimated rays 213c–213d and 214c–214d typically illuminate navigation terrain surface 220 at non-normal incidence, such that they reflect as exit rays 213e–213f and 214e–214f from portions of surface 220 identified as areas 223 and 224. These exit rays are typically processed to create processed rays 214g–214j, which are then captured by detector 217. Detector 217 then provides a signal to processor 218 in response to the captured image.

By comparing successive stored frames, processor 218 can determine relative motion, such that a correlation calculation of successive frames can be used to determine the distance and the directions of the relative movements. Processor 218 obtains electrical power, for example from power source 210 through power connection 219. A captured frame overlaps partially with successive captured frames. Thus, navigation software algorithms can "look" at specific identifiable points on more than one frame and then calculate the distance and direction of the relative motion. By storing successive frame pairs, overlap characteristics can be determined in processor 218 using traditional correlation algorithms, thereby yielding direction and magnitude of movement. This process is detailed in U.S. Pat. No. 5,786,804, and is widely used for optical pointing devices which rely on comparison of successive surface frames, where the surface frames have been generated according to traditional technology, for example, by shadows created by optical radiation reflecting from surfaces.

Various types of illumination sources have distinguishing attributes that are suited for particular navigation conditions. For example, the illumination sources may have differing spatial position, thus interacting differently with optical elements, navigation terrain, and sensor(s). Likewise, the illumination sources may have differing wavelengths, radiant fluxes, spectral linewidths, polarizations, or combinations of these parameters. The differing spatial position parameter can allow relaxed manufacturing tolerances. For example, the illumination sources whose spatial positions correspond to the best navigation performance can be selected either during the manufacturing process or during operation. This allows relaxation or maintenance of design tolerances, as spatial diversity of illumination sources allows a trade-off between positional tolerance of an illumination source and a plurality of illumination sources. During the manufacture of the mouse, selection of illumination sources can be established permanently by directing current to selected illumination source(s). Alternatively, selection can be performed through electrical control during operation of the mouse. In all cases, electrical current is directed either to one source or to plural sources in varying degrees.

In optical mouse 200, as shown in the example of FIG. 2, dual optical radiation sources 203, 204 are different types. Source 203 may be, for example, an LED which emits broadband light, whereas source 204 may, for example, be a laser which typically emits a narrower wavelength spectrum and provides the optical mouse imaging system a longer coherence length of optical radiation to improve navigation performance for certain surface types. The longer coherence length may be utilized to image speckle from the navigation surface or to provide an illumination source for specular reflection navigation, where macroscopic surface variations on the navigation surface cause intensity patterns on the detector. Coherence, as referred to herein, includes both temporal coherence, i.e., narrow spectral width or strong correlation between the amplitude and/or phase of optical radiation from the source at any one time and at earlier or later times, and spatial coherence, i.e., strong correlation between the instantaneous amplitudes and between the instantaneous phase angles of the wavefront at any two points across the beam of optical radiation from the source (see for example A. E. Siegman, "Lasers," University Science Books, 1986, pp. 54–55). Low coherence optical sources include, for example, diode emitters, such as LEDs, various multimode laser diode types, or white light (see for example J. C. Wyant, "White Light Extended Source Shearing Interferometer," Applied Optics, Vol. 13, No. 1, January 1974, pp. 200–202, hereby incorporated by reference).

Because of surface imperfections (typically present, unless the surface is optically polished) or other non-uniformities, for example intentional granularity, on areas 223 and 224, different rays, for example 213e–213f and 214e–214f will have different times of travel, resulting from different surface heights at different points of reflection. The different travel times of different rays produce phase differences between different rays, generating phase patterns on rays 213e–213f and 214e–214f. These phase patterns may be imaged using interferometric techniques. Alternative types of interferometers that may be used in accordance with the invention include, for example, Michelson (Twyman–

Green), Mach-Zehnder, Fizeau, and interferometer implementations having single or multiple diffractive elements, as described in co-pending and commonly assigned U.S. patent application Ser. No. 10/439,674, the disclosure of which has been incorporated by reference. For more detailed discussion of these interferometers, see for example D. Malacara, "Optical Shop Testing," Wiley-Interscience, ISBN 0471522325, 2nd Ed., January 1992, Chapters 1–7, hereby incorporated by reference.

Optical mouse 200 optionally includes transmissive diffraction grating 215, which processes phase-patterned rays 213e–213f and 214e–214f prior to capture by detector array 217. Grating 215 produces two overlapping offset phase-patterned beams represented by rays 214g–214i and 214h–214j respectively. These define overlap area 225, where rays 214h and 214i (and all rays therebetween) interfere, i.e. add or subtract, depending upon their phases relative to one another. Similarly, rays 213e and 213f originating from optical radiation source 203 are diffracted by grating 215 into two diffraction orders that produce two overlapping offset phase-patterned beams (not shown for simplicity in FIG. 2) that define a different overlap area. Accordingly, diffraction grating 215 effectively performs the function of a shear plate.

Diffraction grating 215 may, for example, represent parallel plate, prism, dual or multiple gratings, or any optical element that performs the function of a shear plate, i.e., that enables shearing interferometry. A parallel plate structure can be recognized as an example of a typical shearing interferometer, in which optical interference results from spatial overlapping between a phase-patterned optical field with a displaced version of the phase-patterned optical field. Although the shearing interferometer typically provides advantages over other type of interferometers, optical navigation techniques in accordance with the invention are not limited to shearing interferometry, and different types of interferometers may be utilized according to desired specific applications.

Optical element 216 between diffraction grating 215 and detector array 217 projects an image of area 223 of navigation terrain 220 through diffraction grating 215 onto detector array 217. This produces an interferogram on detector array 217, which detects the interferogram and provides a signal to processor 218. Optionally, optical element 216 and diffraction grating 215 may be combined into a single monolithic or integrated structure.

However, if navigation terrain 220 were to move relative to optical mouse 200 as indicated by direction arrows 221 and 222, a different unique interferogram would be generated, typically uniquely dependent on the new surface area of phase-patterned reflection. For example, if surface 220 moves longitudinally relative to optical mouse 200, as depicted by arrows 221 and 222 in FIG. 2A, then new area 224 of navigation terrain 220 may be imaged, resulting in an interferogram shifted relative to the previous interferogram. By using interferometric techniques, relative movement even over very smooth surfaces, for example, glass (but typically not optically polished surfaces) can be determined.

Figure 3:
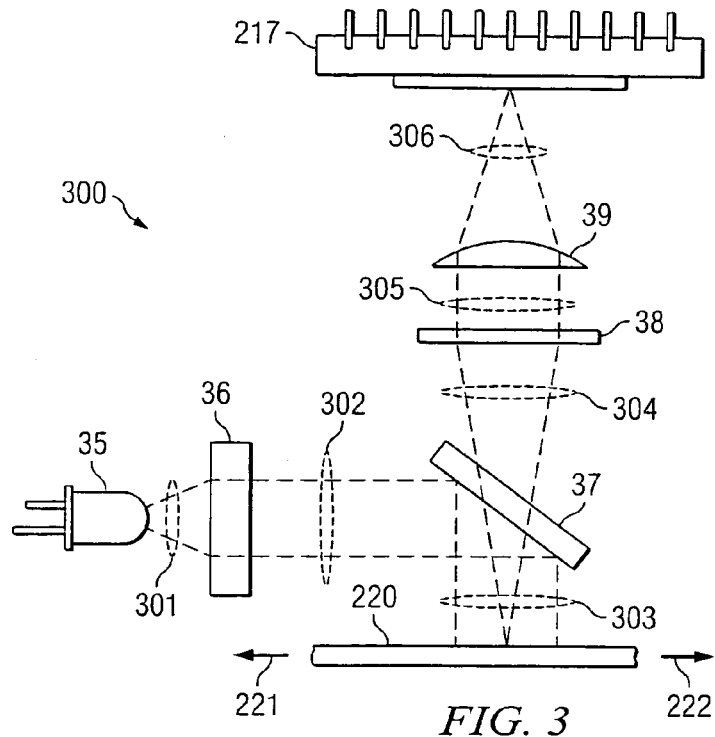
FIGS. 3–4 are diagrams depicting a detector associated with illumination optics, in accordance with the invention.
Figure 4:
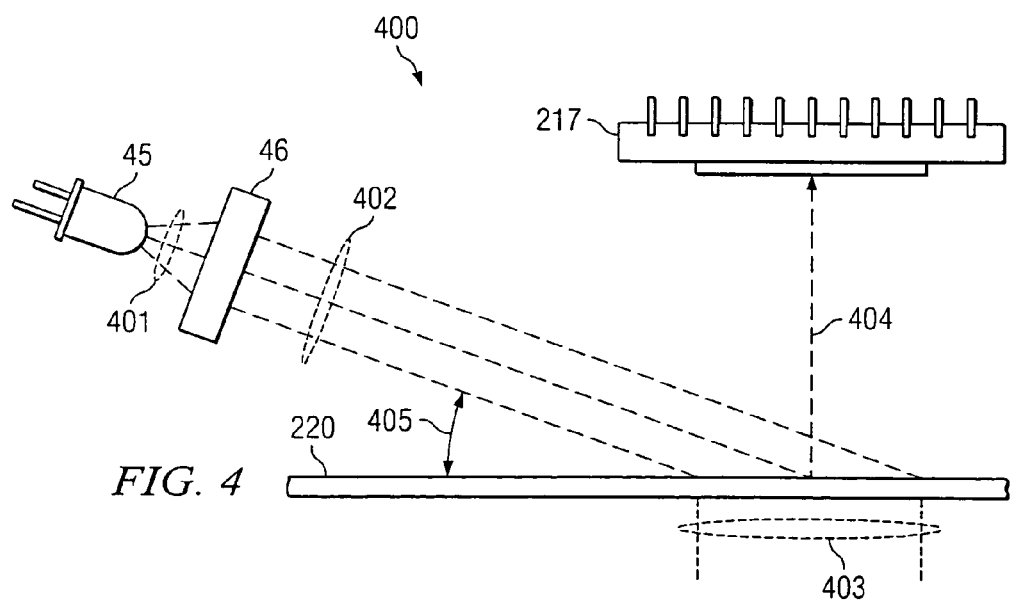

FIGS. 3 and 4 are diagrams depicting detector 217 associated with illumination optics, for example, in source module 103. FIG. 4 depicts illumination at grazing angle 405. FIG. 3 shows illumination by incoherent light source 35 in source module 103, which is directed normal to the surface of the navigation terrain 220. If navigation terrain 220 contains paper fibers to be detected by detector array 217, illumination at grazing angle of incidence 405 is typically desired. While not essential, one or more light emitting diodes (LEDs) 45 may be used in source module 103. Illumination source 35 and/or 45 may each, for example include a plurality of individual illumination elements. Grazing angle 405, which is the complement of the angle of incidence, is typically in the range of five degrees to twenty degrees, but may vary depending upon the properties of navigation terrain 220. In illumination embodiment 400 depicted in FIG. 4, source 45 is shown with illumination optics 46, which may include a single optical element or a combination of lenses, filters and/or holographic elements to accomplish suitably collimated and substantially uniform illumination 402 of a surface area, for example, surface area 403. Light reflected or scattered from surface area 403 is typically sampled normal to surface area 403 as indicated by exit beam 404. The wavelength of light emitted by source 45 is typically selected to enhance the spatial frequency information accessed for navigation. Fixed-pattern noise in the illumination field is typically minimized. Light 401 emitted by source 45 may require adjustment to accommodate wide dynamic ranges of reflectivity of navigation terrain 220, for example, as the navigation device proceeds over printed materials with absorbing or reflecting inks or other marking agents.

In illumination embodiment 300 depicted in FIG. 3, light 301 from LED source 35 is collimated by illumination optics 36, and collimated beam 302 is then redirected by optical amplitude beam-splitter 37. For clarity, that portion of the light energy from LED 35 directed to and transmitted through beam-splitter 37 is not shown in FIG. 3. Light energy 303 reflected from beam-splitter 37 illuminates navigation terrain 220 normal to the surface.

Also represented in FIG. 3 is the portion of light energy 304 that is reflected or scattered from navigation terrain 220 and passed through beam-splitter 37 for aperturing and filtering at element 38 into filtered beam 305. Filtered beam 305 is then directed by navigation optics 39 into detected beam 306 to form a pattern on detector array 217. For clarity, the portion of light energy passing from navigation terrain 220 to beam-splitter 37 and reflecting from the beam-splitter is not shown. The magnification of navigation optics 39 is typically substantially uniform over the field-of-view of detector array 217. In many applications, the modulation transfer function, i.e. the amplitude measure of optical frequency response, of navigation optics 39 is designed to attenuate below the Nyquist spatial frequency that is determined by the pitch of sensor elements of detector array 217 and by the magnification of navigation optics 39. Navigation optics 39 are typically configured to prevent background illumination from introducing noise. Alternatively, a wave-front type beam-splitter may be used.

The selection of an angle of incidence depends upon the material properties of the navigation terrain. Grazing angles of illumination generate longer shadows and more apparent contrast, or AC signal, if the surface of the navigation terrain is not glossy. The DC signal level, however, increases as the illumination angle approaches the normal to the navigation terrain surface.

Illuminating target region 403 of navigation terrain 220 at grazing angle 405 works well for applications in which the surface of navigation terrain 220 has a high degree of roughness at the microscopic level. For example, the introduction of illumination from source 45 at a grazing angle provides a high signal-to-noise ratio of data related to inherent structural features when the navigation terrain is, for example, stationery, cardboard, fabric, or human skin. On the other hand, the use of incoherent light at a normal angle of incidence may be selected in applications in which position data is needed to track navigational device movement along such navigation terrain surfaces as photographs, glossy magazine pages, and overhead transparency films. With illumination using normally incident incoherent light, viewing the navigation terrain in the specular reflected field will provide an image that is sufficiently rich in texture content to allow image and correlation-based navigation. The surface of the navigation terrain has a microscopic relief such that the surface reflects light as if the surface were a mosaic of tiles, or facets. Many of the "tiles" of a navigation terrain surface thus reflect light in directions slightly perturbed from the normal. A field of view that includes both scattered light and the specularly reflected light can thus be modeled as though the surface were composed of many such tiles, each tilted somewhat differently with respect to the normal. This modeling is similar to that described in W. W. Barkas, "Analysis of Light Scattered from a Surface of Low Gloss into Its Specular and Diffuse Components," Proc. Phys. Soc., Vol. 51, pages 274–292 (1939).

In a further embodiment, coherent illumination is introduced at normal incidence to permit speckle-based navigation. Relative motion between a scanning device and a navigation terrain surface may be tracked by monitoring motion of speckle patterns relative to the navigation sensors. If coherent illumination is used without imaging optics, then by selecting a small area of illumination and by having a relatively large separation between the surface of the navigation terrain and the detector array, the resulting speckle pattern contains predominant speckle cell sizes sufficiently large to satisfy the Nyquist sampling criterion. The use of a beam splitter allows the direction of both the incident illumination and the detected scatter to be near normal to the surface of the navigation terrain, as depicted in FIG. 3. In some embodiments, it may be advantageous to use a temporally modulated illumination source. For example, the image detection system can lock onto the temporal frequency and/or phase of the illumination to discriminate against background noise.

In accordance with the invention, a preselected angular distribution of reflected light from the navigation terrain is captured by the detector of an optical navigation device. Typically, the detector of the optical navigation device is positioned to capture the specular reflection from the surface of the navigation terrain. The specular reflection creates an image of the surface that differs from both shadow pattern images and speckle patterns. Specular reflection typically provides a stronger signal compared to the shadow pattern image approach. This allows high contrast patterns to be obtained, even on substantially smooth surfaces. Additionally, quality is preserved with respect to Lambertian surfaces, because light is scattered into the specular direction among other directions. Specular reflection patterns depend on the wavelength parameters of the illumination source; typically, the contrast in the specular reflection pattern increases as the bandwidth of the illumination source narrows. Consequently, laser based illumination provides the highest contrast.

In accordance with the invention, power requirements may be relaxed by using an illumination source whose wavelength lies at the peak of the detector responsivity curve. The contrast of the specular reflection patterns depends on the degrees of spatial and temporal coherence of the illumination source. Use of a narrow band illumination source, for example a vertical cavity surface emitting laser (VCSEL) or narrow band light emitting diode (LED), provides enhanced pattern contrast at reduced power. Broadening the wavelength bandwidth induces averaging, resulting in lower contrast, because returns from individual scatterers illuminated at different wavelengths add incoherently. Therefore, in accordance with the invention, for reliable optical navigation, the bandwidth of the illumination source is narrow enough to have sufficient coherent interference to produce patterns of sufficiently high contrast. For example, an illumination source having a bandwidth on the order of 20 nanometers (nm) provides sufficient contrast for optical navigation over a large range of surfaces in the office desktop environment.

Light rays of a beam incident on a smooth navigation surface reflect and remain concentrated in a bundle upon exiting the smooth surface. However, if a surface is microscopically rough, then the light rays reflect and scatter in many different directions. The spatial frequency corresponding to the surface roughness may be on the scale of the illumination wavelength. Each individual ray follows the law of reflection. However, in the case of a rough surface, each individual ray meets a portion of the surface that has a different orientation. Therefore, the surface normal is different for different incident light rays. Hence, when the individual rays reflect according to the law of reflection, the individual rays scatter in different directions. Furthermore, when either coherent or quasi-coherent illumination is provided, high contrast intensity patterns produced by interference among the reflected and the scattered light ray components may be observed in the specular reflected direction. The interference effects provide enhanced contrast to the pattern for navigation.

Figure 5:
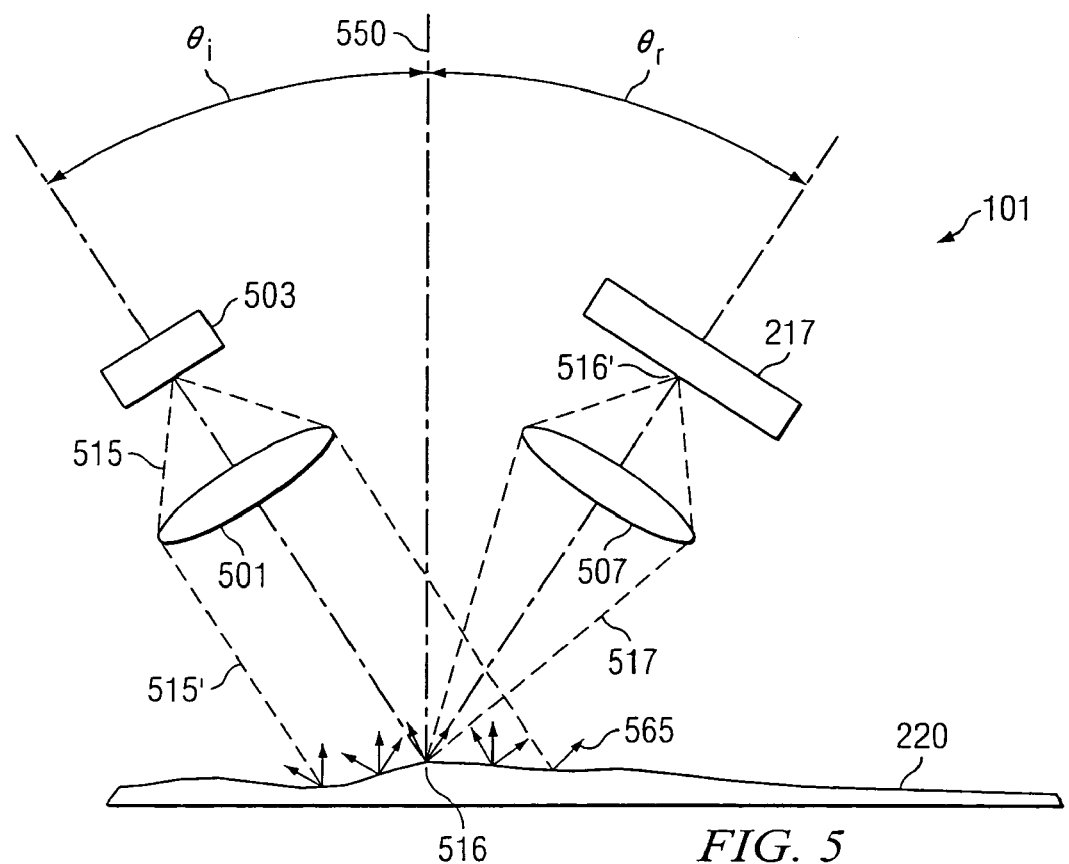
FIG. 5 shows a simplified illustration of components for optical navigation device, in accordance with the invention.

FIG. 5 shows a simplified illustration of components for optical navigation device 101 in accordance with the invention. Light source 503, part of light source module 103 (see FIG. 1), is positioned at incident angle $\theta_i$ with respect to surface normal 550 and provides light beam 515 incident on optical element 501 to produce beam 515'. Optical element 501 is optional and functions primarily to improve the collection efficiency for beam 515. Optical element 501 may, for example, be a collimating lens. However, beam 515 need not be collimated if, for example, light source 503 is a laser such as a VCSEL or edge emitter. If light source 503 is quasi-coherent source, for example a narrow band LED (light emitting diode) or LED with a narrow bandwidth filter, then optical element 501 or a limiting aperture may be desired for navigation on smooth surfaces. Use of a limiting aperture reduces the power incident on surface 220 but improves spatial coherence. If optical element 501 is used, optical element 501 may be a diffractive or refractive lens or other suitable optical element and may be optically coated to improve performance. Instead of using a limiting aperture together with a conventional narrow-band LED, a narrow-band edge emitting LED may be used as the light source.

Detector array 217, part of detector module 104 (see FIG. 1), is positioned at reflection angle $\theta_r$ relative to a mean surface normal 550, selected such that $\theta_r \approx \theta_i$. Only reflected rays 565 from surface 220 having $\theta_r \approx \theta_i$ make up specular beam 517 and will be received by detector array 217. An illuminated portion of surface 220 is captured by optical element 507. For example, point 516 on surface 220 is captured by optical element 507 onto point 516' on detector array 217. Hence, optical element 507 allows capture by detector array 217. The pattern produced by a coherent light source typically includes surface features and interference features. The interference features arise from coherent addition of individual rays in the specular reflection field. Optical element 507 may be a diffractive or refractive lens or other suitable optical element, and may be optically coated with a dielectric thin film to improve performance. Light source 503 typically is a narrow-band laser source, for example a VCSEL (vertical cavity surface emitting laser) or an edge emitting laser, whereas detector array 217 is typically a CCD, CMOS, GaAs, amorphous silicon or other suitable detector array. Performance of detector array 217 may be improved by application of anti-reflection dielectric coatings to detector array 217.

Having a higher surface contrast and resolution allows optical navigation device 101 to navigate on smoother surfaces. The effective surface resolution is defined as the smallest resolvable feature on the navigation surface, i.e., surface 220. The effective surface resolution depends on the modulation transfer function, the magnification of the optics, and the effective pixel size of the detector array, for example detector array 217. If magnification is fixed, higher surface resolution requires, for example, that detector array 217 have smaller pixels. The maximum navigation speed over surface 220 for optical navigation device 101 is limited by the maximum frame rate of detector array 217, as well as by the processing time for cross-correlation calculation. The physical displacement of optical navigation device 101 with respect to surface 220 is measured in units of effective pixel size. The effective pixel size is the size on surface 220 corresponding to a pixel size in detector array 217. This means that if the pixel size of detector array 217 of optical navigation device 101 is reduced, the responsivity or maximum navigation speed of optical navigation device 101 will be reduced. Typically, tradeoffs between the cost of detector array 217, processor 105 (see FIG. 1), total power consumption, and desired reponsivity are considered and balanced to arrive at the surface resolution and optical magnification for embodiments in accordance with the invention.

As optical navigation device 101 moves relative to surface 220, narrow-bandwidth scatter patterns are created at different relative positions between optical navigation device 101 and surface 220. Each scatter pattern is created by the specular reflection from surface 220 that is in the field of view of detector array 217. The narrow-bandwidth scatter pattern depends strongly on the wavelength of light source 503. Typically, the wavelength of light source 503 is selected to be at the peak responsivity wavelength of detector array 217. Because pattern contrast and signal are typically improved over prior art shadow-pattern optical navigation systems, shorter detector integration times are required, allowing higher frame rate acquisition to allow higher navigation speed. Optical navigation device 101 may contain a plurality of light sources including, for example, light source 503.

By comparing successive stored narrow bandwidth specular reflection patterns in processor 105, the relative motion of optical navigation device 101 with respect to surface 220 can be determined. Correlation of successive narrow bandwidth scatter patterns is typically used to determine the displacement of the relative movement. Successive captured scatter patterns partially overlap with one another. Hence, processor 105 identifies features in each captured scatter pattern and calculates the displacement and direction of the relative movement. Using stored successive scatter patterns, overlapping features can be identified by processor 105 using standard image correlation algorithms to provide direction and displacement. Further details may be found, for example, in U.S. Pat. No. 5,786,804 incorporated herein by reference. In accordance with the invention, relative motion even over very smooth but not optically polished surfaces, for example glass, can be determined.

Figure 6:
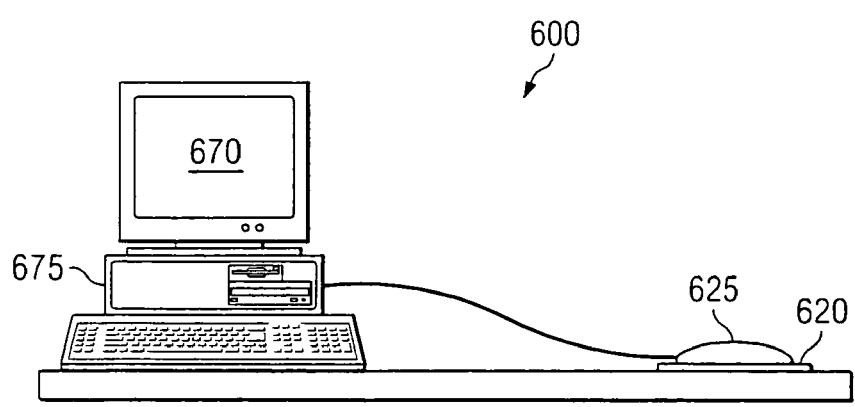
FIG. 6 is a representation of a system in accordance with the invention, where an optical mouse moves over a fixed navigation terrain surface.

FIG. 6 is a representation of system 600 in accordance with the invention, where optical mouse 625 moves over fixed navigation terrain surface 620. Optical mouse 625 typically includes a detector array unit such as detector array unit 217 of FIG. 5. Optical mouse 625 may also contain a plurality of light sources including, for example, light source 503. A series of specular reflection patterns is typically converted to positional information in optical mouse 625 by processor 105 (see FIG. 1) and sent by wire or sent wirelessly to central processor unit 675 for display on video screen 670 as a positional pointer, for example an arrow. Alternatively, raw or intermediate data may be sent from detector array unit 217 (see FIG. 5) to central processor unit 675 for processing. Wireless communication may be either radio-frequency or infrared. Wireless embodiments of optical mouse 625 in accordance with the invention may be powered, for example, by a rechargeable battery, fuel cell, or solar cells.

FIGS. 7A–7B are flow diagrams depicting methods of operating an optical navigation system having plural sources of optical radiation, in accordance with the invention. FIG. 7A depicts a method 700 of operating an optical navigation system having plural sources of optical radiation for determining relative movement between an optical navigation device and an object. The method includes providing an optical navigation system, for example optical navigation system 100 or optical mouse 200, in operation 702. The optical navigation system includes at least a first source, for example source 203, and a second source of optical radiation, for example source 204, for illuminating the object, represented for example by navigation terrain surface 220. The at least first source differs from the at least second source in at least one operating parameter. The optical navigation system further includes a detector, for example detector array 217, for capturing patterns in the exit beam after illuminating, represented for example by exit rays 213e–213f and 214e–214f. As depicted in operation 703, the method further includes selecting initially an at least one differing operating parameter for the at least first and at least second sources 203, 204, and as depicted in operation 704, switching electric current selectively to the at least first and/or at least second sources to implement the selected at least one differing operating parameter. As depicted in operation 705, the method further includes illuminating the object, as depicted in operation 706, capturing the patterns in the optical radiation after illuminating, and as depicted in operation 707, evaluating the captured patterns. As depicted in operation 708, the method includes changing the selected at least one differing operating parameter in response to decision criteria.

FIG. 7B depicts an expansion of operation 708 of operating method 700, illustrating a scenario for changing the selected operating parameters in response to decision criteria in operation 708, according to one embodiment of the invention. As depicted in operation 710, optical navigation system 100 evaluates captured patterns and other operating conditions to determine if an eye safety hazard is present. If an eye safety hazard is present, then as depicted in operation 711, electric current to optical radiation sources 203, 204 is reduced to a predetermined lower level, and as depicted in operation 716, the system resumes evaluating patterns, and repeats the process through operations 708 and 710.

If no eye safety hazard is present at operation 710, then as depicted in operation 712, optical navigation system 100 evaluates battery power to determine if it is falling. If battery power is falling, then as depicted in operation 711, electric current is reduced and the system proceeds through operations 716, 708, and 710 in a fashion similar to that depicted for detection of an eye safety hazard in operation 710.

If battery power is determined not to be falling in operation 712, then as depicted in operation 713, the system evaluates captured frames to determine if navigability is adequate according to predetermined decision criteria. If navigability is not adequate, then as depicted in operation 714, selected operating parameters are changed in response to the decision criteria, and the system proceeds through operations 716 and 708 to operation 710. If navigability is determined to be adequate in operation 713, then the system continues without changing operating parameters through operations 715, 716, and 708, until it is required to change operating parameters in response to decision criteria, represented in FIG. 7B by eye safety hazard in operation 710, falling battery power in operation 712, and inadequate navigability in operation 713. It should be noted that, in addition to decision criteria illustrated in the example of FIG. 7B, other predetermined conditions and combinations of conditions may be used as decision criteria.

It will be noted that an advantage of the plural optical radiation source method is improvement in reliability, since active devices that produce the optical radiation affect the overall reliability of the optical mouse. Using plural optical radiation sources provides redundancy that allows extended navigation capability using a redundant optical radiation source for backup if one optical radiation source fails for any of a variety of reasons.

If extended battery life is required under urgent circumstances, for example if the battery voltage is dropping, the electrical switch that supplies current to the light sources can be programmed to select, for example, the lowest power consuming optical radiation source. In the current technology, for higher illumination levels, this source may be laser based, for example using vertical cavity surface emitting laser (VCSEL) technology, which has demonstrated slope efficiencies of approximately 40 percent. By contrast, traditional LEDs typically require current of about 30 mA at high illumination levels. However, when low illumination levels are adequate, for example when navigating on less dark or less optically absorptive surfaces, the LED may be more efficient than the VCSEL. It will be noted that optical radiation sources having differing coherence lengths will be spatially separated in typical embodiments. This allows for selection of grazing low coherence optical radiation to provide standard surface imaging, and for selection of higher coherence optical radiation for optimized shear interferometry, specular reflection methods, or speckle methods.

Embodiments of this invention provide enhanced navigation terrain coverage and reduced electrical power consumption in an optical mouse, particularly for battery-powered operation. Improved performance is provided over problematic navigation terrains, for example smooth surfaces with minimal features, such as glass. Through a switched current supply arrangement, power can be supplied selectively to any single or plural optical radiation source, enabling enhanced performance of the optical measurement system and concurrently potentially reducing peak current consumption, thus offering extended battery life.

In some embodiments, optical radiation sources may include an LED for low coherence applications, which for example can be fitted with a selectively actuated wavelength bandpass filter to increase coherence length. This source configuration offers advantages of dual coherence with simplicity and low construction cost, but does not reduce current consumption, except when low illumination levels are adequate. Some embodiments can offer automatic switching to lower power to provide dimming of the optical radiation, for example to reduce eye safety hazard if the human eye is subject to inadvertent exposure to the optical radiation source, for example if the optical mouse falls or is otherwise displaced from the navigation surface. Improved eye safety is also realized in an embodiment in which an LED operating at a visible wavelength is used in combination with a substantially invisible optical source utilized primarily for navigation. In this embodiment, the visible wavelength LED provides illumination, for example red light, visible to the eye to reduce pupil diameter. Reduction of the pupil diameter increases the allowable power level for improved eye safety for the invisible wavelength optical source utilized primarily for navigation.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. An optical navigation system for determining movement relative to a navigation terrain, said system comprising:

a first source and a second source of optical radiation for illuminating a portion of said navigation terrain, said first source differing from said second source in at least one operating parameter;

means to select said first source and said second source independently based on decision criteria; and a detector for capturing patterns in said optical radiation subsequent to said illuminating of said navigation terrain.

2. The optical navigation system of claim 1 wherein said at least one operating parameter is selected from spatial position, beam divergence, beam convergence, angle of incidence, radiant flux, wavelength, spectral linewidth, polarization, coherence, electric current consumption, and temporal modulation.

3. The optical navigation system of claim 1 wherein said first source and said second source are selected from diode emitters, LEDs, vertical-cavity surface-emitting lasers (VCSELs), laser diodes, and white light.

4. The optical navigation system of claim 1 wherein said patterns are selected from the group consisting of shadow, speckle, scatter, phase, and specular reflection patterns.

5. The optical navigation system of claim 4 further comprising an interferometric element for converting said phase patterns to interference patterns for capture by said detector.

6. The optical navigation system of claim 5 wherein said interferometric element is selected from shearing, Fizeau, Michelson, Mach-Zehnder, and Twyman-Green interferometric elements.

7. The optical navigation system of claim 5 wherein said interferometric element is a shearing element positioned between said navigation terrain and said detector for creating an interference overlap between said phase patterns.

8. The optical navigation system of claim 1 comprising an optical navigation device operable to move relative to said navigation terrain.

9. The optical navigation system of claim 1 wherein said means to select is selected from electric switching devices, electric resistive devices, electric modulating devices, and optical filtering devices.

10. A method for determining relative movement between an optical navigation device and a navigation terrain, said method comprising:
provanding an optical navigation system comprising:
a first source and a second source of optical radiation for illuminating a portion of said navigation terrain, said first source differing from said second source in at least one operating parameter; and
a detector for capturing patterns in said optical radiation subsequent to said illuminating;
selecting initially said at least one differing operating parameter for said first and said second sources independently;
illuminating said navigation terrain portion;
capturing patterns in said optical radiation subsequent to said illuminating;
evaluating said captured patterns; and
changing said selected at least one differing operating parameter in response to decision criteria.

11. The method of claim 10 wherein said at least one differing operating parameter is selected from spatial position, beam divergence, beam convergence, angle of incidence, radiant flux, wavelength, spectral linewidth, polarization, coherence, electric current consumption, and temporal modulation.

12. The method of claim 10 wherein only said first source is selected.

13. The method of claim 10 wherein said first source and said second source are simultaneously selected.

14. The method of claim 10 wherein said decision criteria are selected from navigability of said navigation terrain, consumption of electric current, eye safety, optical alignment tolerances, and combinations of said decision criteria.

15. The method of claim 10 wherein said changing comprises comparing said evaluated patterns relative to said decision criteria.

16. The method of claim 10 wherein said captured patterns are selected from shadow, speckle, scatter, phase, and specular reflection patterns.

17. The method of claim 10 further comprising moving an optical navigation device relative to said navigation terrain, said optical navigation device comprising said first source and said second source.

18. The method of claim 17 wherein said optical navigation device controls a positional pointer on the display of a computer.

19. The method of claim 17 wherein said evaluating comprises converting correlations between successive pairs of said captured patterns into signals corresponding to movement of said optical navigation device relative to said navigation terrain.

20. The method of claim 19 further comprising using said signals to create a surface representation of a portion of said navigation terrain represented by said captured patterns.

21. The method of claim 10 wherein said optical navigation system further comprises one or more additional sources similar to said first sources and one or more additional sources similar to said second source.

22. The method of claim 21 wherein a plurality of said additional sources similar to said first source and said additional sources similar to said second source is simultaneously selected.

* * * * *